June 2, 1942.     H. L. STRUBE     2,284,692
VIBRATING SCREEN
Filed April 23, 1940     2 Sheets-Sheet 1

Inventor:-
Harry L. Strube
by his Attorneys
Howson & Howson

June 2, 1942.   H. L. STRUBE   2,284,692
VIBRATING SCREEN
Filed April 23, 1940   2 Sheets-Sheet 2
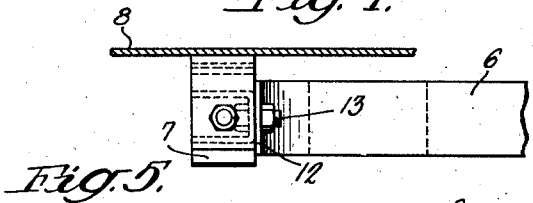
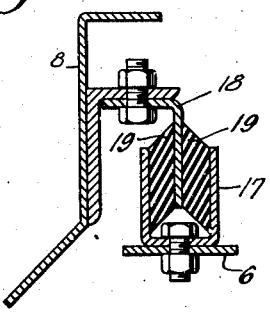
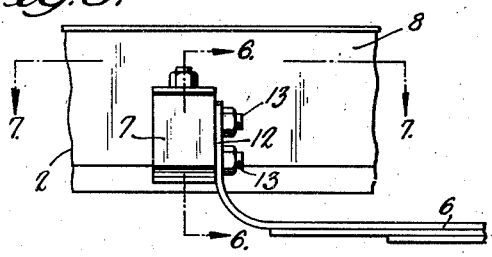
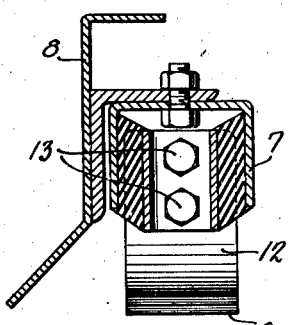
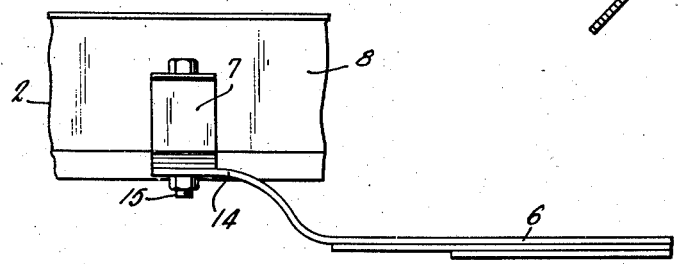
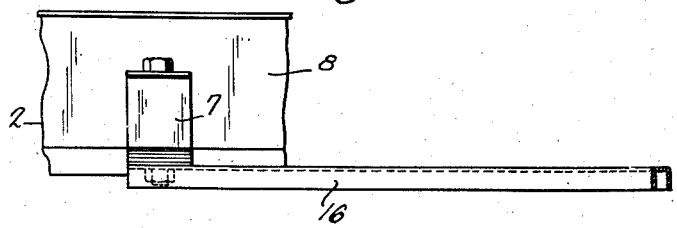
Inventor:-
Harry L. Strube
by his Attorneys
Howson & Howson Patented June 2, 1942

2,284,692

UNITED STATES PATENT OFFICE 2,284,692

VIBRATING SCREEN

Harry L. Strube, Philadelphia, Pa., assignor to Link-Belt Company, Chicago, Ill., a corporation of Illinois Application April 23, 1940, Serial No. 331,245

3 Claims. (Cl. 209—326)

This invention relates to vibrating screens, and a principal object of the invention is to provide an improved suspension for screens of this type which shall afford a more adequate control of the vibratory movements set up in the screen, shall be smoother and more efficient in operation, and shall be more durable and less subject to deterioration than the suspensions of the prior art.

It has been the conventional practice to provide vibrating screens with suspensions made entirely of spring steel. These all-steel suspensions are frequently inadequate to control the vibration, and are subject to breakage. The inadequacies of the convetnional steel suspensions are particularly pronounced in screens which employ unbalanced pulleys or equivalent means to impart the vibratory motion, since with this type of actuation there is a critical speed through which the mechanism must pass wherein an inordinate vibration is set up which if not controlled may prove extremely destructive. As an alternative to the conventional steel suspension, it has been proposed to mount the screen frame or box on rubber pads supported on a rigid base, but such mountings while affording a somewhat better control of excessive vibration at the critical speeds were not of a character to utilize to best advantage the properties of the rubber and were subject to rapid deterioration.

By combining resilient metal and rubber (or its equivalent) in accordance with the principles hereinafter set forth, I have found it possible to provide a suspension for vibrating screens which avoids in large degree the disadvantages inherent in the use of these materials individually, and which is not only more efficient in operation, but which is more durable and less subject to deterioration and breakage than the suspensions of the prior art. I have discovered further that rubber if properly applied is characteristically well adapted for use in suspensions for vibrating screens and in itself is capable of affording highly satisfactory results in that function.

The invention will be more readily undertsood by reference to the attached drawings, wherein:

Fig. 5 is a fragmentary side elevational view illustrating a modification within the scope of the invention;

Fig. 6 is a section on the line 6—6, Fig. 5;

Fig. 7 is a section on the line 7—7, Fig. 5;

Figs. 8 and 9 are fragmentary side elevational views illustrating further embodiments of the invention, and Fig. 10 is a sectional view illustrating still another modification within the scope of the invention.

Figure 1:
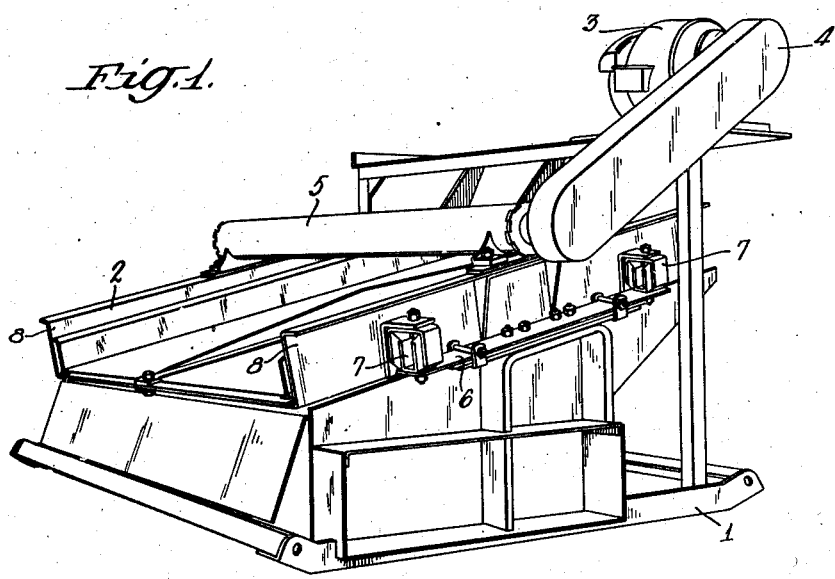
Figure 1 is a view in perspective of a vibrating screen unit made in accordance with my invention.
Figure 2:
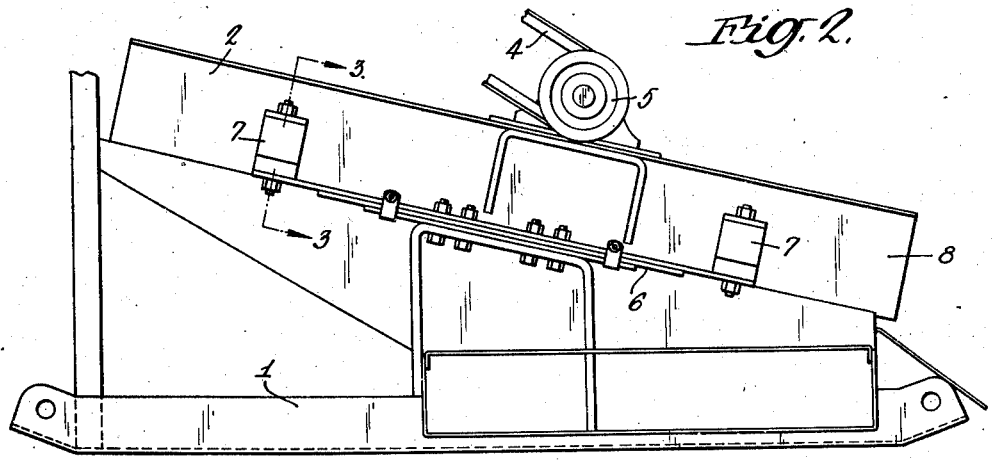
Fig. 2 is a side elevational view of the unit.

The vibrating screen unit shown in Figs. 1 and 2 of the drawings consists essentially of a base frame 1, a screen frame or box 2 resiliently mounted or suspended in the base frame, and a motor 3 which is mounted on the frame and which is operatively connected, through suitable transmission means 4, with an unbalanced rotor 5 journaled on the screen member. Actuation of the rotor 5 through the prime mover 3 imparts a vibratory motion to the screen members in accordance with the conventional practice.

In a preferred embodiment of the invention, the resilient suspension for the screen frame comprises resilient elements of metal and rubber interposed between the base 1 and frame 2 so as to complement each other in the function of controlling the vibrations imparted to the frame as previously described. The principle is illustrated, for example, in Figs. 1 to 4 of the drawings, wherein the suspensicn is shown as consisting of two leaf spring assemblies 6, 6, supported on the base 1 at opposite sides respectively of the screen frame 2 and attached to the latter by means of elements 7 of resilient rubber, the said elements being established between the ends of the springs and the side members 8, 8 of the screen frame.

Figures 3, 4:
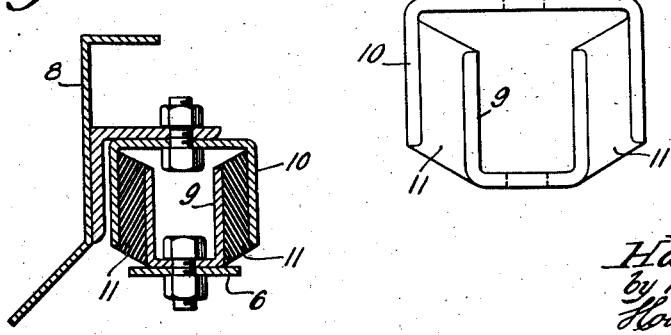
Fig. 3 is an enlarged sectional view on the line 3—3, Fig. 2.
Fig. 4 is an enlarged detached end elevational view of one of the elements of the screen suspension.

Preferably, the elements 7 are of the form shown in Figs. 3 and 4. As therein illustrated, the elements consist of two rigid members 9 and 10, which in the present instance are connected respectively to the spring 6 and one of the side members 8, 8 of the screen frame, and to and between which are secured, preferably by vulcanization, pads 11, 11 of resilient rubber. The arrangement is such that the pads 11 are loaded and function under shearing stress, and I have found that this character of rubber shear attachment is peculiarly well adapted to the requirements of vibrating screen operation.

For control of vibration, it is desirable that the vibratory movements or impulses be opposed by a maximum obtainable non-reactive inertia, and since rubber can be most easily deformed under shear load, it follows that this material, for vibration control purposes, is most efficient when made to work in shear. It will be noted that in the illustrated embodiment of the invention, the elements 7 are so constructed and arranged that the shear stresses imposed upon the pads 11 are in vertical planes extending longitudinally of the screen frame and, therefore, parallel to the planes in which the vibratory movements of the screen frame occur as a result of the rotation of the transverse unbalanced rotor 5. Accordingly, the elements 7, while affording a high degree of freedom for vibration of the screen frame, constitute a highly efficient medium for absorbing and controlling excessive vibrations and for maintaining the vibrations within the desirable amplitude range.

The rubber elements 7 and springs 6 have a highly desirable complementary effect in which each contributes to the suspension as a whole certain desirable characteristics inherently lacking in the other. It is apparent that the rubber elements 7 function collectively to relieve the springs 6 of the heavy stresses which otherwise would be imposed upon them. This is due primarily to the vibration-absorbing characteristics of the rubber which are particularly pronounced in the type of shear attachment described above. This ability of the rubber to absorb and control vibration is in excess of that of the metal springs, and the rubber elements not only exercise a superior vibration control but also prevent in large degree the direct imposition of excessive vibration upon the spring elements. The metal springs, on the other hand, by assuming a substantial portion of the vibration load materially reduce the stresses imposed directly upon the rubber elements, and in this manner prevent the rapid deterioration of the rubber. Each of the rubber and metal elements of the suspension acts further to modify the action of the other in supporting the vibratory movements of the screen frame, with the result that the said movement is extremely smooth, regular and free from shock. The suspension as a whole is not only functionally efficient but is extremely durable.

It is apparent that a suspension made in accordance with the invention may assume a wide variety of forms, and various modifications within the scope of the invention are illustrated in Figs. 5 to 9, inclusive. In Figs. 5, 6 and 7, the extremities 12 of the leaf springs 6 are turned out of the normal plane of the spring in a vertical plane, and the rubber elements 7 are secured by bolts 13 to the offturned extremities 12. In all other respects, the suspension corresponds to that previously described. The offturned ends of the springs afford greater latitude for a horizontal component of the vibratory motion, and to a corresponding degree relieve the stresses imposed upon the rubber elements.

In Fig. 8, the terminal ends of the springs 6 are offset vertically from the normal planes of the spring as indicated at 14. The rubber elements 7 in this case are secured by bolts 15 to the offset ends 14 of the springs. In this case also the spring takes a substantial part of the horizontal component of the vibratory movement.

In Fig. 9, the rubber element 7, which is attached to the screen frame 2 in the manner previously described, is supported upon a rigid base member 16, the elements 7 thereby constituting the sole resilient suspension means. The elements 7 are loaded and operate in shear as previously described and form a highly desirable form of suspension for the vibrating screen member.

In Fig. 10, I have illustrated a somewhat different form of rubber element consisting in this instance of an upright channel section 17, which is attached to the spring 6, or directly to the base 16 as previously described, and a flanged element 18 which extends into the channel 17 and is secured to the sides of the latter through the medium of rubber pads 19, 19. It will be noted that in this case also the rubber pads 19, 19 work in shear in accordance with the principle set forth above.

Still further modification of the suspension device is possible within the scope of the invention, and such modifications may involve a relative rearrangement of the essential elements of the device as well as changes in the specific forms of those elements.

I claim:

1. In a vibrating screen or the like, a base frame; a vibratory screen frame, unbalanced rotary means carried solely by the screen frame for vibrating the latter in predetermined planes; leak springs interposed between the base frame and screen frame for flexure in planes substantially parallel to the planes of vibration of said screen frame; securing elements carried by the screen frame and springs adjacent the ends of the springs and each having faces disposed in planes substantially parallel to the planes of vibration imparted to said screen frames by said unbalanced rotary means; and rubber members disposed between and having surfaces secured to the faces of said securing elements, said rubber members being displaceable in shear in planes substantially parallel to the planes of vibration imparted to said screen frame by said unbalanced rotary means; said leaf springs and rubber members serving jointly to resiliently support the screen frame from the base frame and complementing each other in the control of the vibrations imparted to said screen frame by said unbalanced rotary means.

2. In a vibrating screen or the like, a base frame; a vibratory screen frame; unbalanced rotary means carried solely by the screen frame and having its axis disposed transversely of the longitudinal axis of the screen frame for vibrating the latter in substantially vertical planes; leaf springs interposed between the base frame and screen frame for flexure in substantially vertical planes; securing elements carried by the screen frame and springs adjacent the ends of the springs and each having faces disposed in substantially vertical planes; and rubber members disposed between and having surfaces secured to the substantially vertical faces of said securing elements, said rubber members being displaceable in shear in substantially vertical planes by said unbalanced rotary means; said leaf springs and rubber members serving jointly to resiliently support the screen frame from the base frame and complementing each other in the control of the vibrations imparted to said screen frame by said unbalanced rotary means.

3. In a vibrating screen or the like, a base frame; a vibratory screen frame having spaced side portions; means carried solely by the screen frame for vibrating said screen frame in substantially vertical planes; leaf springs mounted on the base frame at each side of the screen frame and adjacent the spaced side portions thereof for flexure in substantially vertical planes; pairs of cooperating securing elements carried by the screen frame and springs, one member of each cooperating pair being mounted on one of the side portions of the screen frame adjacent the ends of the springs and the other member of each cooperating pair being mounted on and adjacent the end of one of the leaf springs, said securing elements each having faces disposed in substantially vertical planes; and rubber members disposed between and having surfaces secured to the substantially vertical faces of said securing elements, said rubber members being displaceable in shear in substantially vertical planes by said vibrating means; said leaf springs and rubber members serving jointly to resiliently support the screen frame from the base frame and complementing each other in the control of the vibrations imparted to said screen frame by said vibrating means.

HARRY L. STRUBE.